(12) United States Patent
Chow et al.

(10) Patent No.: US 6,609,124 B2
(45) Date of Patent: Aug. 19, 2003

(54) HUB FOR STRATEGIC INTELLIGENCE

(75) Inventors: Amy W. Chow, Norwalk, CT (US);
Michael J. Danke, Houston, TX (US);
Julie J. Pietrzak, Boulder, CO (US);
Larry L. Proctor, Coppell, TX (US);
Edward L. Smierciak, Danbury, CT (US); Terry K. Tullis, Aliso Viejo, CA (US)

(73) Assignee: International Business Machines Corporation, Armonk, NY (US)

( * ) Notice: Subject to any disclaimer, the term of this patent is extended or adjusted under 35 U.S.C. 154(b) by 43 days.

(21) Appl. No.: 09/928,743

(22) Filed: Aug. 13, 2001

(65) Prior Publication Data

US 2003/0033274 A1 Feb. 13, 2003

(51) Int. Cl.[7] .............................................. G06F 77/30
(52) U.S. Cl. .......................................................... 707/5
(58) Field of Search ..................................... 707/3, 5, 6

(56) References Cited

U.S. PATENT DOCUMENTS

| | | | |
|---|---|---|---|
| 5,708,825 A | 1/1998 | Sotomayor | 345/762 |
| 5,873,056 A | 2/1999 | Liddy et al. | 704/9 |
| 5,895,470 A | 4/1999 | Pirolli et al. | 707/102 |
| 5,933,822 A | 8/1999 | Braden-Harder et al. | 707/5 |
| 5,999,927 A | 12/1999 | Tukey et al. | 707/5 |
| 6,026,388 A | 2/2000 | Liddy et al. | 707/1 |
| 6,038,561 A | 3/2000 | Snyder et al. | 707/6 |
| 6,076,088 A | 6/2000 | Paik et al. | 707/5 |
| 6,088,692 A | 7/2000 | Driscoll | 707/5 |
| 6,101,515 A | 8/2000 | Wical et al. | 707/531 |
| 6,131,091 A | 10/2000 | Light | 707/5 |
| 6,148,289 A | 11/2000 | Virdy | 705/1 |
| 6,161,084 A | 12/2000 | Messerly et al. | 704/9 |
| 6,167,370 A | 12/2000 | Tsourikov et al. | 704/9 |
| 6,189,002 B1 | 2/2001 | Roitblat | 707/1 |
| 6,192,360 B1 | 2/2001 | Dumais et al. | 707/6 |
| 6,233,575 B1 | 5/2001 | Agrawal et al. | 707/6 |
| 6,304,864 B1 | 10/2001 | Liddy et al. | 706/15 |

FOREIGN PATENT DOCUMENTS

EP          1 003 111 A1     11/1999

OTHER PUBLICATIONS

Chen et al. Intelligent Spider for Internet Searching, Jan. 1997, Proceedings of the 30nd Hawaii International Conference on System Sciences, vol. 4, pp. 178–188.*

Teng et al "Collaborative Web Crawling: Information Gathering/ Processing over Internet" Jan. 1999 Proceedings of the 32nd Hawaii International Conference on System Sciences, pp. 1–12.*

* cited by examiner

Primary Examiner—Jack Choules
(74) Attorney, Agent, or Firm—McGinn & Gibb, PLLC; Jay H. Anderson, Esq.

(57) ABSTRACT

A method and structure for searching a computerized network of databases containing documents uses a web crawler. The web crawler is provided with conceptual guidelines before the searching. The invention summarizes and performs text clustering on the summaries to produce classifications. The text clustering is performed using seeds based on the conceptual guidelines. The invention then provides, through a user interface, the classifications and a query entry to search the classifications and directs (in response to the query entry) the user to one or more of the classifications, such that the user is directed to the classifications (and hyperlinks to the documents) and the user is not provided the documents themselves.

20 Claims, 4 Drawing Sheets

HUB FOR STRATEGIC INTELLIGENCE

BACKGROUND OF THE INVENTION

1. Field of the Invention

The present invention generally relates to a system and method for providing information and more particularly to an improved index that classifies links according to previously categorized data resources.

2. Description of the Related Art

The invention was designed to address the problems that e-business strategy and design consultants have in gathering information to be assessed and analyzed to develop e-business strategies for their external clients. For example, a substantial portion of engagement hours were being consumed by gathering information—instead of assessing and analyzing it.

Prior to the invention, the process of gathering information was very ad hoc in nature; consultants would scour the Web, proprietary research sources, internal databases and use personal contacts to gather recent robust information relevant to their needs. There was no method or common tool that would be the single point of entry to such sources, nor was there a clear understanding of an efficient, best practice method of gathering such data, nor was it obvious as to what information (when found) could be applied to areas of a deliverable. A "deliverable" is an end document or product required by a customer. Consultants therefore found their own methods to gather information and used their own favorite search tools and their own organization capabilities to help relay the information to the project team.

Therefore, there is a need for a system and method that organizes the resources available to e-business strategy and design consultants to reduce the amount of time such consultants spend gathering information and also to provide a system that furnishes the most current form of the resources in question. The invention described below addresses this problem and provides a novel system and method to reduce the time consultants spend gathering information.

SUMMARY OF THE INVENTION

The invention has many goals, including affording a user a tool that enables critical speed to important data, providing a standard method/process for gathering information for e-business strategy engagements, providing a single point of entry to relevant, recent and robust documents and data applicable to e-business strategy engagements, adding value to the research gathering process by organizing the search criteria around standard corporate methods and client deliverables, supporting consultants with intelligent software to aid in targeting their search process, and providing the consulting team a networked space to maintain interesting documents until they become applicable to their analysis.

In one embodiment, the invention comprises a method of searching a computerized network of databases containing documents using a web crawler. The web crawler is provided with conceptual guidelines before the searching. The invention summarizes and performs text clustering on the summaries to produce classifications. The text clustering is performed using seeds based on the conceptual guidelines. The invention then provides, through a user interface, the classifications and a query entry to search the classifications and directs (in response to the query entry) the user to one or more of the classifications, such that the user is directed to the classifications (and hyperlinks to the documents) and the user is not provided the documents themselves.

The invention hyperlinks to the documents in place of providing the documents. The summaries are based upon extensible markup language tags associated with the documents. Links to each of the documents may appear in at least two classes of the classifications. The invention identifies intersections of multiple classes that each respond to a user search. Such intersections represent occurrences of different classes which separately return links to a single document in response to the user search. The conceptual guidelines refine the searching and the text clustering to direct the classifications to a specific result.

Still, there are additional advantages for the consultant in using the invention (which is sometimes referred to herein as "Hub Content Management Tool", "HCMT" or simply "Hub") including providing access to proprietary research sources currently expensive to purchase on an individual basis, providing close adherence to the e-business strategy methodology to enable a clear understanding of what is being researched and what needs to be recovered, providing automated taxonomical representations of the data that enables discovery during the search process that would otherwise take hundreds to thousands of hours of intensive reading efforts, and finally storing links to documents, rather than the entire document itself, to afford the user confidence in access to recent information as deemed true by the original source and not the system administrator.

Such advantages contribute to the ultimate benefit, which is that the time spent researching for quality information is dramatically reduced by the technology used in the invention to organize and present the information to the user, specifically around the way consultants work.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF PREFERRED EMBODIMENTS OF THE INVENTION

The invention encompasses a complete content gathering, summarization, indexing, classification, searching, and presentation application. Examples of conventional search and retrieval systems include keyword searching applications that typically are used for text HTML (hypertext markup language) or Web searches where a keyword that appears in the document content is used to retrieve the document. Another conventional application is SQL (Structured Query Language) and is typically used for databases of numbers (such as financial information)—where a specialized language is used to retrieve specific numeric data. Another well-known application is termed Natural Language and is typically used for text searching where the question is parsed by the system to try to interpret its meaning and the relevant documents are retrieved on that basis.

The Hub for Strategic Intelligence system is unlike all the above systems in that it uses text clustering to help consultants create business-driven taxonomies for the data, and that it presents these classifications to support the presentation of a hitlist.

Figure 1:
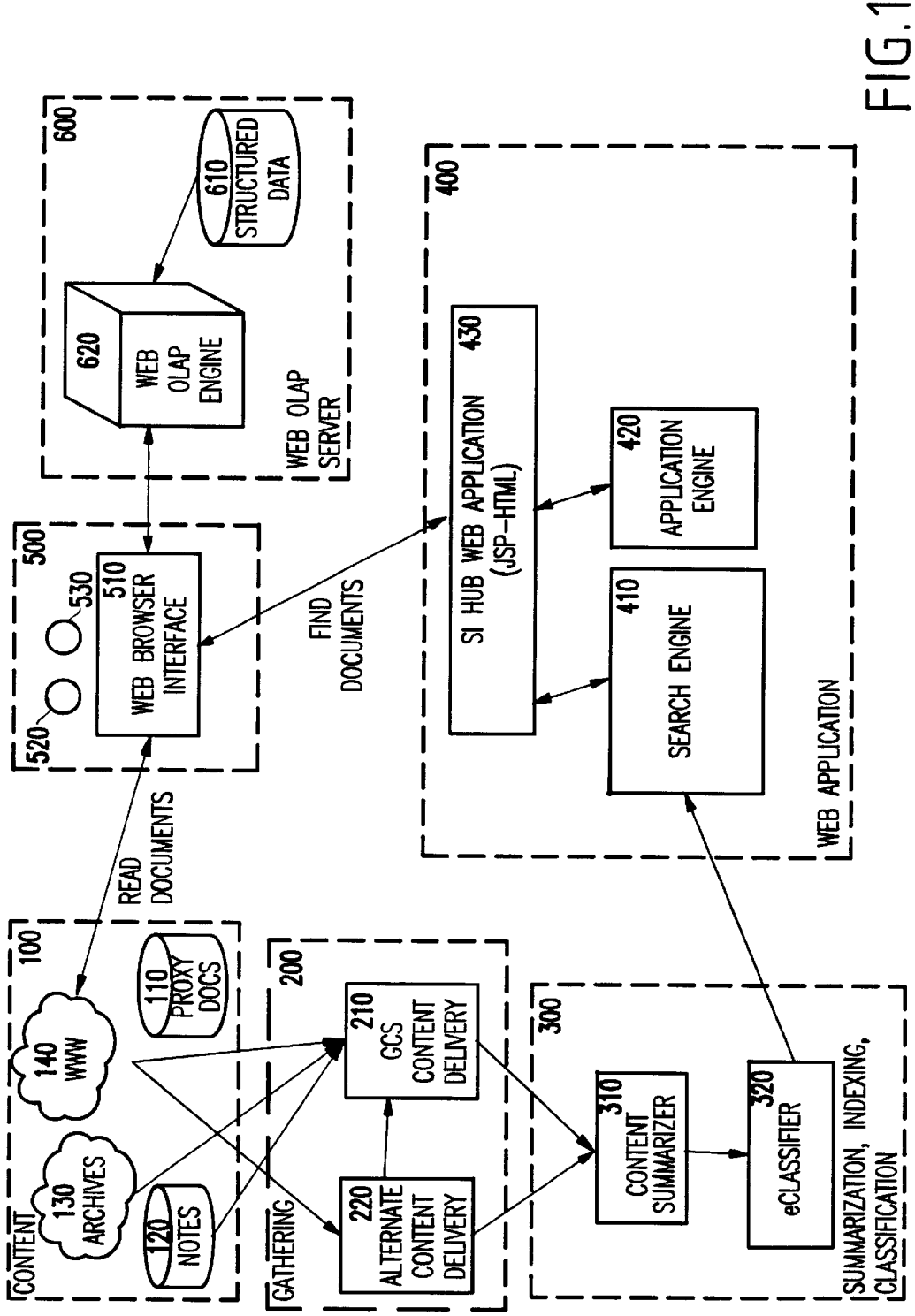
FIG. 1 is a schematic diagram of a system embodiment of the invention.

As shown in FIG. 1, there are a large amount of content sources [100] available to the strategy consultant. For instance, these resources can include public and private databases (some of which are fee-based), public and private networks (such as the Internet or corporate networks), as well as public and private databases. These resources come in a variety of technical formats, including proxy documents [110], Lotus Notes [120], archives and/or mirror sites [130], and the Internet [140]. In a preferred embodiment, the invention does some selection ahead of time to ensure that the sources that the invention are crawling are relevant to the business consultant. For example, in this pre-selection phase, the invention provides an interface for the consultant (user) to enter terms/categories that the consultant knows will relate to a certain client or group of clients, to aid the Web crawler in its activity. It may be necessary to obtain licenses for some of the databases.

Item [200] represents a gathering phase in the use of the tool. Here, the relevant resources are crawled and changed into a format accpetable for the text clustering tool. In a preferred embodiment, a Web crawler is used to search the Internet for documents that may be of interest to consultants. This type of Web crawling and subsequent translation for indexing is fairly common, for example, the invention can use Grand Central Station (GCS) (available from International Business Machines Corporation, Armonk, N.Y., USA), which is a tool that crawls the identified source's website or database (e.g., Lotus Notes) to extract text from the resources available. Therefore, item [220] represents alternate content delivery and item [210] represents the GCS content delivery. The crawler creates abstracts (e.g., summaries) of the documents based on the article text. An important aspect of the invention is that is that it creates classifications based on summaries, which is more reliable than simply reading the meta tags. Further, the invention classifies paragraphs and sections within each document separately to more throughly classify each document. This process is more reliable because Web developers can put any form of information in the meta tags, even if such information is unrelated to the document contents. The corpus, or combination of abstracted text from all of the content resources, is then ready for the classification process.

Item [300] represents the content summarizing, indexing, and classifying process. The abstracts thus gathered by the web crawler are summarized in the content summarizer [310]. More specifically, the content summarizer distills the abstracts to eliminate redundant words/phrases and eliminate words/phrases that are not related to content (e.g., adverbs, adjectives, participles, etc.). Then the distilled abstracts (summaries) are imported into a classification (text clustering) application, such as eClassifier [320] (available from International Business Machines Corporation, Armonk, N.Y., USA), which works with mathematical algorithms to develop centroids, or, perfect/ideal concepts, and automatically relate the crawled documents to them. Such relationships are called classifications, which a consultant evaluates for practicality on engagements.

The invention allows the consultant to control the text clustering application. This allows the consultant to not only observe what categories were identified, it also allows the consultant to use additional topics/themes of categories that have been useful on e-business strategy engagements in the past, and uses the text clustering application's capabilities to develop those centroids. Thus, the invention differs from the current practice of using random starting points (seeds) for the clustering application, and this allows the invention to identify a series of classes that are as separate as possible. One goal of consultants is to create distinct groupings by choosing points widely separated in the data space and this goal is achieved with the invention. The invention create classifications by allowing the consultant to enter starting points for classes based on the business concepts that the consultants will find useful. Documents with similar words/concepts cluster together. Said another way, the invention clusters the documents on hyperplanes suited to the methodology of the consultant and consultant interests. The invention, through the user interface allows the consultant a number of ways to achieve optimal clustering to create useful categories. These include allowing the consultant to use "keywords" up as a method of creating initial classifications, and to use a subset of training documents to create natural and consultant-driven classifications that are then extended to a larger dataset, and adjusting the classifications after the text clustering algorithm. This approach leads to having multiple, equally valid classifications for the same dataset.

By carefully constructing the starting seed positions, the consultant using the invention can create substantial improvements over more traditional approaches. The starting points depend on the consultant's knowledge of the topics to be categorized. For conceptual areas with which the consultant is unfamiliar, natural classifications can be done to facilitate an overall understanding, followed by creating classifications based on the methodology of the client and consultant interests. Classification, for purposes of this application, is one way that the text clustering program can organize data. A "natural" classification arises from text to cluster starting at random starting point and depends on the corpus. "Consultant-driven" classifications arise from consultant-guided text clustering. A classification can also be a combination of "natural" and "consultant-driven" clustering. For purposes of this invention, the term "content" can include many different types of documents, including research reports, news articles, analytical reports, proxy documents, etc.

Finally, if the invention produces documents that are less relevant, the consultant can use the invention to manually move the articles (and corresponding datapoints) from the cluster. Item [400] represents the Web application that includes a search engine [410], an application engine [420] in the invention [430] (SI Hub Web application). The Web application takes the results of the classification process and presents the same to the consultant through the Web browser interface [510] in item [500].

The classifications produced with the invention represent the same dataset from different viewpoints and this allows consultants to quickly zero in on their desired concept by using the invention to "stack" classes (e.g., observe the intersection between these different viewpoints). Each dataset may have multiple classifications, meaning the classes are different (because the starting points were different). An important feature of the invention is that each document can show up in different classes. Since each article shows up in at least one class in every classification, documents may show up in two or more classes, which is a break with traditional cluster analysis. For example, an article about a cell phone may show up in a "Wireless" classification under the class "Access Devices." Other classes might be "Infrastructure" or "Protocols." The same article may show up in a classification by "Consumer Electronics" under the class "cell phone." Other classes might include "stereos" or "MP3 players." The same article may show up in a classification by "Consumer Behavior" in the class "Purchasing Behavior." Other classes might include "Brand Loyalty" or "Use of References." Thus, the invention goes beyond the concept of intersecting categories by intersecting categories that are created using text clustering.

This feature of the invention is referred to as "stacking classifications" or perhaps more accurately, "stacking classes." Using the above example, a consultant may desire to find articles about consumers who love their cell phones. This is a tough search on traditional search engines, because it is really the concepts that count, and not the exact words. In this case, the consultant might choose the following classes (that are produced by the inventive clustering process described above) "Consumer Behavior:Brand Loyalty" and "Consumer Electronics:cell phone." Another feature of the invention is that it does not return the entire document (or even the entire document summary), and instead only returns hyperlinks for articles related to both concepts. Since these two classes look at the same set of articles in two different ways, their intersection proves very valuable. With the invention, the time spent searching for consultant requests drops by around three-quarters (75%).

Further, the user interface provides the consultant with a listing of the most common words in each classification. An area of the user interface called "explore classifications" [520] aids the consultant in the search process by showing the set of related concepts as determined by the automated summarization process, discussed above.

In addition to the text interface, the invention uses features referred to as "mindmaps" [530] to represent classifications. This visually oriented interface presents classifications (not hitlists) as a means of exploration. The mindmap shows the strength (e.g., through location, color, brightness, etc.) of relationship between the concept (or keyword) the consultant has entered and the classifications produced by the invention Item [510] represents the user interface, which is accessed on a Web browser. The invention compares the user's keyword to query the classes in the inventive classification and returns the classes that are most relevant. Thus, the invention presents classifications (not hitlists) in response to a query. Further, each of the classes or classifications does not include data copied from a reference, but instead simply contains a hyperlink to the reference. The invention moves the user from a class in one classification to the nearest (mathematically-determined) class in another classification.

Item [600] represents the Web OLAP (on line analytical processing) server that has an OLAP engine [620] and structured data [610]. There are many standard approaches to accessing data through the Web. In this case, the invention has a generic representation of the Web interface [510] accessing the Web OLAP engine [620] to retrieve some structured, non-text data [610]. There are documents [610] that do not contain any text, and as a result, these documents cannot be placed in a dataset with other text documents. The invention solves this problem by formatting proxy documents in an XML (extensible markup language) derivative (called HubML) to aid in the classification of data.

The summaries are XML summaries. XML is an open standard used for defining data elements on a web page and business-to-business documents. It uses a similar tag structure as HTML; however, whereas the HTML defines how elements are displayed, XML defines what those elements contain within rigid rules. HTML uses predefined tags, but XML allows tags to be defined by the developer of the page. By providing a common method for identifying data, XML supports business-to-business transactions. The invention sets up the HubML using metadata contained in the XML. Since the HubML document is text based, it stands in for the numeric data and allows the invention to classify and include "uncrawlable" files in the results. In addition, the invention uses the survey questions (used to from the XML tags) to allow the consultants to search on such survey questions as well as the summaries.

Each HubML document is created manually, using information from a variety of sources. In the current embodiment, these hand-built HubMLs (as opposed to the crawler generated ones) draw information from different sources that describe "cubes". Cubes are similar, but more complicated structurally than a spreadsheet. Companion documents describe what is on the spreadsheet (cube). Thus, HubML companion documents contains a lot of information about the hub (where to locate the style sheet); the cube itself (the title, abstract, filename, file size, when it was created); the survey (the questions used and the text, when the data was collected, etc.); and concepts for the topics covered by the survey.

Such "concepts" are ideas that may come up during a search. For example, someone might be interested in a given topic "cruises", so a HubML document containing the word "cruises" would be a direct hit. An important feature of the invention is that not only does it find direct hits, it also finds near hits based on the concept classification. For example, someone may be interested in "travel". Travel is NOT explicitly listed in the concept section, but because cruises and travel often appear in the same article, those concepts would fall into the same class, using the classification scheme described above. Thus, although a particular HubML document does not have the word "travel" in it, consultants searching on "travel" may well find this document in their results.

Various services offer portals to access data sources; however, they charge fees or limit access to the databases. In researching other offerings, most solutions to this problem are realized by compiling databases together to provide, for instance "company specific" or "market intelligence" information. While the portal aspect is considered in the invention as it provides a single point of entry to many sources, there is additional value in this portion of the invention. More specifically, the invention allows the consultant to search by the client deliverable. example of this would be a consumer products company as a client that is interested into moving into the "wireless space". The consultant would want to come up to speed quickly in this context. Other benefits of the invention include vastly reduced search time, vastly reduced time to create taxonomies, more comprehensive coverage of topics, and additional idea generation and time savings by finding topics in articles that are "close" but not necessarily exact keyword matches.

This invention can also benefit other environments, including company strategy monitoring, signpost monitoring, knowledge management within a company, e-learning environments, general public search engines as well as any other data that uses cluster analysis. The starting points depend on the consultant's knowledge of the topics to be categorized. There is considerable skill involved in selecting "good" starting points.

Figure 2:
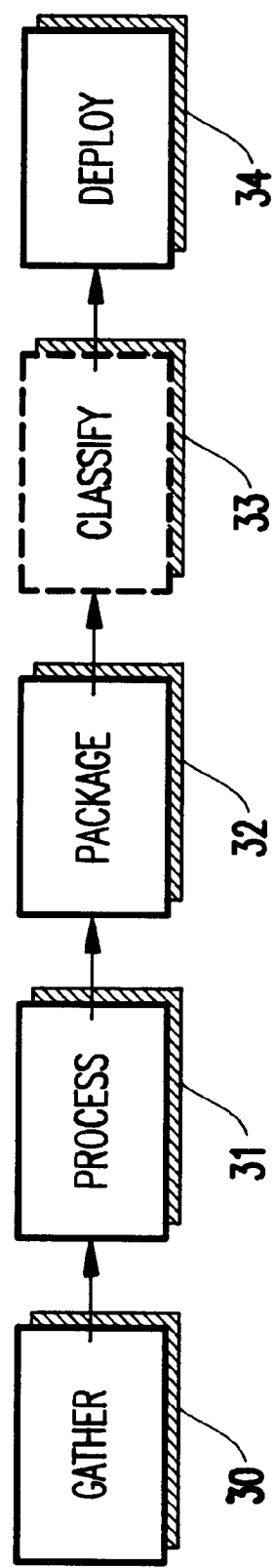
FIG. 2 is a flowchart showing the processing of the invention.
Figure 3:
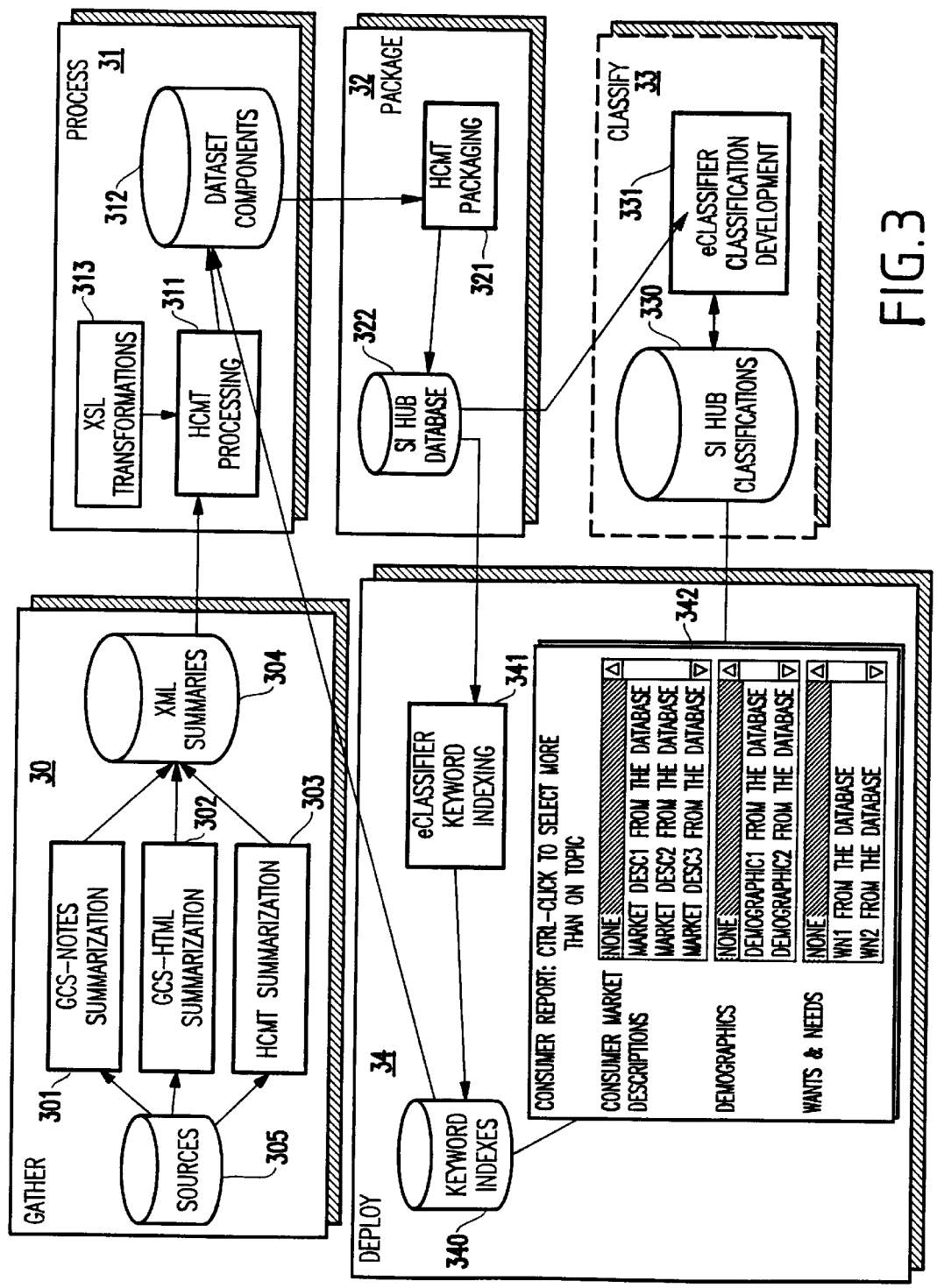
FIG. 3 is an exploded diagram of the embodiment shown in FIG. 2.

The invention simplifies and unifies a complex process using network technology to integrate and leverage the power of a web crawler and search classifier. FIGS. 2 and 3 illustrate the major processing points of the invention in flowchart form and shows the invention from a different perspective, so as to more clearly illustrate additional features of the invention. In FIG. 2, the invention first gathers information [30], processes the information [31], packages the information [32], classifies the information [33], and deploys the information in item [34]. These functions are described in greater detail with respect to FIG. 3 below.

As shown in FIG. 3, in the gather function [30], the invention gathers the content from sources [305] (metadata) by acquiring text from the source [305], summarizing it [304], and hyperlinking the summaries back to the original source location. The identified sources [305] can be in any form such as GCS notes summarizations 301, GCS HTML summarizations [302] or HCMT summarizations [303].

With respect to the process function [31], the invention uses the text clustering program to perform all the necessary operations to result in all data set components required by the search classifier. The processing involves organizing data by content stores for the classifier to identify the contents of the text, date, stores, etc. as well as to identify the contents of matter data, linkage to source location, and other aspects of the content. Thus, the invention preforms XSL translations [313] and the above "Hub" processing [311] to produce dataset components [312].

With respect to the packaging function [32], the invention organizes the content in various combinations to be utilized in different applications. Packaging [321] is the process of taking the process data for both the classifier and the hub to allow a "mix-and-match" of content delivered in different formats from the same gathering and processing operations to result in the SI Hub dataset [322].

In the classifier operation [33], the invention relies upon the text clustering application [321], using seeds customized by the consultant (as discussed above) to organize the content according to the end-users' needs to produce the SI Hub classifications [330]. As discussed above, the classifying is done by a subject-matter-expert (consultant) who is aware of the clients needs so as to afford the user a clear and organized presentation of content to be searched. Existing consultations are updated automatically as new content is packaged. Finally, in item [34], the "deploy" operation [34] the developed classifications [341] and the computed keyword indexes [340] are presented to the user in an interface having pull down menus and concept searching paths [342].

Figure 4:
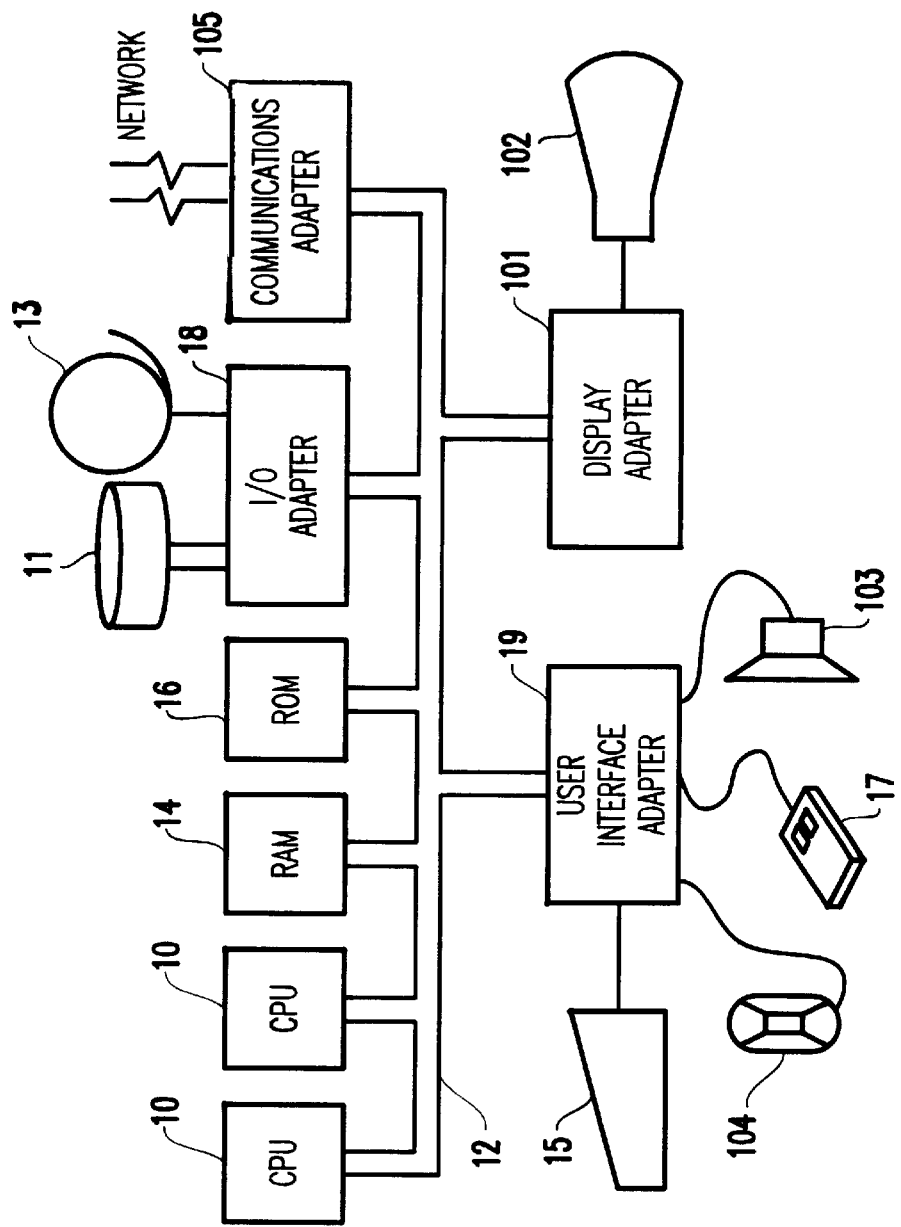
FIG. 4 is a schematic diagram of a hardware embodiment for operating the invention.

A representative hardware environment for practicing the present invention is depicted in FIG. 4, which illustrates a typical hardware configuration of an information handling/computer system in accordance with the subject invention, having at least one processor or central processing unit (CPU) [10]. CPUs [10] are interconnected via system bus [12] to random access memory (RAM) [14], read-only memory (ROM) [16], an input/output (I/O) adapter [18] for connecting peripheral devices, such as disk units [11] and tape drives [13], to bus [12], user interface adapter [19] for connecting keyboard [15], mouse [17], speaker [103], microphone [104], and/or other user interface devices such as touch screen device (not shown) to bus [12], communication adapter [105] for connecting the information handling system to a data processing network, and display adapter [101] for connecting bus [12] to display device [102]. A program storage device readable by the disk or tape units, is used to load the instructions which operate on a wiring interconnect design which is loaded also loaded onto the computer system.

Thus, as shown above, the invention provides access to research sources, provides close adherence to the e-business strategy methodology to enable a clear understanding of what is being researched and what needs to be recovered, provides automated taxonomical representations of the data that enables discovery during the search process that would otherwise take hundreds to thousands of hours of intensive reading efforts, and finally stores links to documents, rather than the entire document itself, to afford the user confidence in access to recent information as deemed true by the original source and not the system administrator. Such advantages contribute to the ultimate benefit, which is that the time spent researching for quality information is dramatically reduced by the technology used in the invention to organize and present the information to the user— specifically around the way consultants work.

While the invention has been described in terms of preferred embodiments, those skilled in the art will recognize that the invention can be practiced with modification within the spirit and scope of the appended claims.

What is claimed is:

1. A method of searching databases comprising:

searching a computerized network of databases containing documents using a web crawler, wherein said web crawler is provided with conceptual guidelines before said searching, and said searching produces search results;

summarizing said search results to produce summaries;

performing text clustering on said summaries to produce classifications, wherein said text clustering is performed using seeds based on said conceptual guidelines; and providing, through a user interface, said classifications and a query entry to search said classifications.

2. The method in claim 1, further comprising providing hyperlinks to said documents in place of providing said documents.

3. The method in claim 1, wherein said summaries are based upon extensible markup language tags associated with said documents.

4. The method in claim 1, wherein links to each of said documents may appear in at least two classes of said classifications.

5. The method in claim 4, further comprising identifying intersections of multiple classes that respond to a user search in said query entry.

6. The method in claim 5, wherein said intersections represent occurrences of different classes which separately return links to a single document in response to said user search.

7. The method in claim 1, wherein said conceptual guidelines refine said searching and said text clustering to direct said classifications to a specific result.

8. A method of searching databases comprising:

searching a computerized network of databases containing documents using a web crawler, wherein said web crawler is provided with conceptual guidelines before said searching, and said searching produces search results;

summarizing said search results to produce summaries;

performing text clustering on said summaries to produce classifications, wherein said text clustering is performed using seeds based on said conceptual guidelines;

providing, through a user interface, said classifications and a query entry to search said classifications; and directing, in response to said query entry, said user to one or more of said classifications, such that said user is directed to said classifications and not to said documents.

9. The method in claim 8, further comprising providing hyperlinks to said documents in place of providing said documents.

10. The method in claim 8, wherein said summaries are based upon extensible markup language tags associated with said documents.

11. The method in claim 8, wherein links to each of said documents may appear in at least two classes of said classifications.

12. The method in claim 11, further comprising identifying intersections of said classes that both respond to a user search in said query entry.

13. The method in claim 12, wherein said intersections represent occurrences of different classes which separately return links to a single document in response to said user search.

14. The method in claim 8, wherein said conceptual guidelines refine said searching and said text clustering to direct said classifications to a specific result.

15. A program storage device readable by machine tangibly embodying a program of instructions executable by said machine for performing a method of searching databases, said method comprising:

searching a computerized network of databases containing documents using a web crawler, wherein said web crawler is provided with conceptual guidelines before said searching, and said searching produces search results;

summarizing said search results to produce summaries;

performing text clustering on said summaries to produce classifications, wherein said text clustering is performed using seeds based on said conceptual guidelines; and providing, through a user interface, said classifications and a query entry to search said classifications.

16. The program storage device in claim 15, wherein said method further comprises providing hyperlinks to said documents in place of providing said documents.

17. The program storage device in claim 15, wherein said summaries are based upon extensible markup language tags associated with said documents.

18. The program storage device in claim 15, wherein links to each of said documents may appear in at least two classes of said classifications.

19. The program storage device in claim 18, further comprising identifying intersections of said classes that both respond to a user search in said query entry.

20. The program storage device in claim 19, wherein said intersections represent occurrences of different classes which separately return links to a single document in response to said user search.

* * * * *